US010878763B2

(12) United States Patent
Hung et al.

(10) Patent No.: US 10,878,763 B2
(45) Date of Patent: Dec. 29, 2020

(54) PIXEL CIRCUIT AND DRIVING METHOD THEREOF

(71) Applicant: Au Optronics Corporation, Hsinchu (TW)

(72) Inventors: Ching-Lang Hung, Hsinchu (TW); Chia-Che Hung, Tainan (TW); Chia-Wei Kuo, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 67 days.

(21) Appl. No.: 16/030,867

(22) Filed: Jul. 10, 2018

(65) Prior Publication Data

US 2019/0279584 A1 Sep. 12, 2019

(30) Foreign Application Priority Data

Mar. 8, 2018 (TW) ............................ 107107959 A

(51) Int. Cl.
*G09G 3/36* (2006.01)
*G02F 1/133* (2006.01)

(52) U.S. Cl.
CPC ..... *G09G 3/3648* (2013.01); *G09G 2310/061* (2013.01); *G09G 2320/0252* (2013.01)

(58) Field of Classification Search
CPC ...... G02F 1/1343; G02F 1/1333; G02F 1/133; G02F 1/1335; G02F 1/1368; G02F 1/1362; G02F 1/136; G02F 1/1337; G02F 1/137; G02F 1/29; G02F 1/1345; G09G 3/20; G09G 3/36; G09G 3/3611; G09G 3/3648; G09G 5/00; G09G 5/10; H01L 27/12
See application file for complete search history.

(56) References Cited

U.S. PATENT DOCUMENTS

| | | | |
|---|---|---|---|
| 8,760,479 B2 | 6/2014 | Shin et al. | |
| 8,867,008 B2 | 10/2014 | Lee et al. | |
| 9,348,188 B2 | 5/2016 | Shin et al. | |
| 9,583,056 B2 | 2/2017 | Pai et al. | |
| 2006/0023137 A1* | 2/2006 | Kamada ........... | G02F 1/136213 349/44 |

(Continued)

FOREIGN PATENT DOCUMENTS

| | | |
|---|---|---|
| CN | 102096258 | 6/2011 |
| CN | 103399441 | 11/2013 |

*Primary Examiner* — Chanh D Nguyen
*Assistant Examiner* — Nguyen H Truong
(74) *Attorney, Agent, or Firm* — JCIPRNET

(57) ABSTRACT

A pixel circuit and a driving method thereof are provided. The pixel circuit includes first to second pixel electrodes, first to third liquid crystal capacitors, a first storage capacitor and first to third switches. The first liquid crystal capacitor and the first storage capacitor locate between the first pixel electrode and a first common voltage. The second liquid crystal capacitor locates between the first and the second pixel electrodes. The third liquid crystal capacitor locates between the second pixel electrode and the first common voltage. The first switch has ends for receiving a data voltage and a scan signal and coupled to the first pixel electrode. The second switch has ends for receiving a second common voltage and a reset signal and coupled to the first pixel electrode. The third switch has ends for receiving a reset voltage and the reset signal and coupled to the second pixel electrode.

17 Claims, 4 Drawing Sheets

(56) References Cited

U.S. PATENT DOCUMENTS

| | | | | |
|---|---|---|---|---|
| 2006/0145987 | A1* | 7/2006 | Hong | G02F 1/1368 345/92 |
| 2008/0284701 | A1* | 11/2008 | Fan-Chiang | G09G 3/3659 345/90 |
| 2008/0284929 | A1* | 11/2008 | Kimura | G02F 1/13624 349/38 |
| 2009/0310047 | A1 | 12/2009 | Shin et al. | |
| 2011/0128460 | A1* | 6/2011 | Cho | G02F 1/134363 349/41 |
| 2011/0141424 | A1 | 6/2011 | Lee et al. | |
| 2014/0247409 | A1 | 9/2014 | Shin et al. | |
| 2016/0147116 | A1* | 5/2016 | Park | G02F 1/133711 349/129 |
| 2017/0287421 | A1* | 10/2017 | Chu | G02F 1/1368 |
| 2017/0307926 | A1* | 10/2017 | Sasaki | G09G 3/3648 |

* cited by examiner

PIXEL CIRCUIT AND DRIVING METHOD THEREOF

CROSS-REFERENCE TO RELATED APPLICATION

This application claims the priority benefit of Taiwan application serial no. 107107959, filed on Mar. 8, 2018. The entirety of the above-mentioned patent application is hereby incorporated by reference herein and made a part of this specification.

BACKGROUND OF THE INVENTION

1. Field of the Invention

The invention relates to a display apparatus, and particularly relates to a pixel circuit and a driving method of the pixel circuit.

2. Description of Related Art

Due to the emergence of liquid crystal display panels, the users' demands on the refreshing rate of the frames and the resolution quality of displays are becoming higher and higher. When the response speed of liquid crystal cells is not quick enough, the frame on the display panel may be blurred or not clear. Under the circumstance, the user's viewing experience may be affected.

In the known technology, since the uniform lying helix (ULH) structure liquid crystal exhibits properties such as a quick response time, a high transmittance ratio, and a low absorption rate, such structure is commonly adopted in display panels as the material for liquid crystal display panels. When driving the ULH structure liquid crystal, the designer often apply different applied electrical fields to deviate optical axes of liquid crystal molecules. However, during alternate changes between positive and negative electrical fields, some liquid crystal molecules may not be able to timely respond to the quick changes in the direction of an electrical field, and the arrangement of liquid crystal molecules may be disordered. Thus, the optical axes of liquid crystal molecules of the ULH structure liquid crystal that are driven may be deviated toward different direction and the overall transmittance ratio may be lowered. Therefore, how to reduce the lowering of the transmittance ratio in the display panel is now an issue to work on.

SUMMARY OF THE INVENTION

One or some exemplary embodiments of the invention provide a pixel circuit and a driving method of the pixel circuit. The pixel circuit and the driving method thereof are capable of resetting a uniform lying helix (ULH) structure liquid crystal in advance before the ULH structure liquid crystal is driven, and facilitating the re-arrangement of liquid crystal molecules of the ULH structure liquid crystal by applying a horizontal electrical field to the ULH structure liquid crustal, so as to reduce lowering of the transmittance ratio.

A pixel circuit according to an embodiment of the invention includes first to second pixel electrodes, first to third liquid crystal capacitors, a first storage capacitor and first to third switches. The first liquid crystal capacitor is located between the first pixel electrode and a first common voltage. The first storage crystal capacitor is located between the first pixel electrode and a first common voltage. The second liquid crystal capacitor is located between the first pixel electrode and the second pixel electrode. The third liquid crystal capacitor is located between the second pixel electrode and the first common voltage. A first switch has a first end receiving a data voltage, a control end receiving a scan signal, and a second end coupled to the first pixel electrode. A second switch has a first end receiving a second common voltage, a control end receiving a reset signal, and a second end coupled to the first pixel electrode. A third switch has a first end receiving a reset voltage, a control end receiving the reset signal, and a second end coupled to the second pixel electrode.

A driving method of a pixel circuit according to an embodiments of the invention. The pixel circuit has a first pixel electrode, a second pixel electrode, and a common electrode transmitting a first common voltage. A liquid crystal layer is disposed between the common electrode and the first pixel electrode as well as the second pixel electrode. The driving method includes the following. A second common voltage is provided to the first pixel electrode and a reset voltage is provided to the second pixel electrode during a reset period. A data voltage is provided to the first pixel electrode and the second pixel electrode is floating during a charging period. The first pixel electrode and the second pixel electrode are floating during an emitting period.

Based on the above, when the pixel circuit according to the embodiments of the invention is operated in the reset period, a horizontal electrical field formed between the first pixel electrode and the second pixel electrode may be adopted to restore liquid crystal molecules in the ULH structure liquid crystal to an initial or default state and rearrange the liquid crystal molecules of the ULH structure liquid crystal, so as to reduce lowering of the transmittance ratio.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
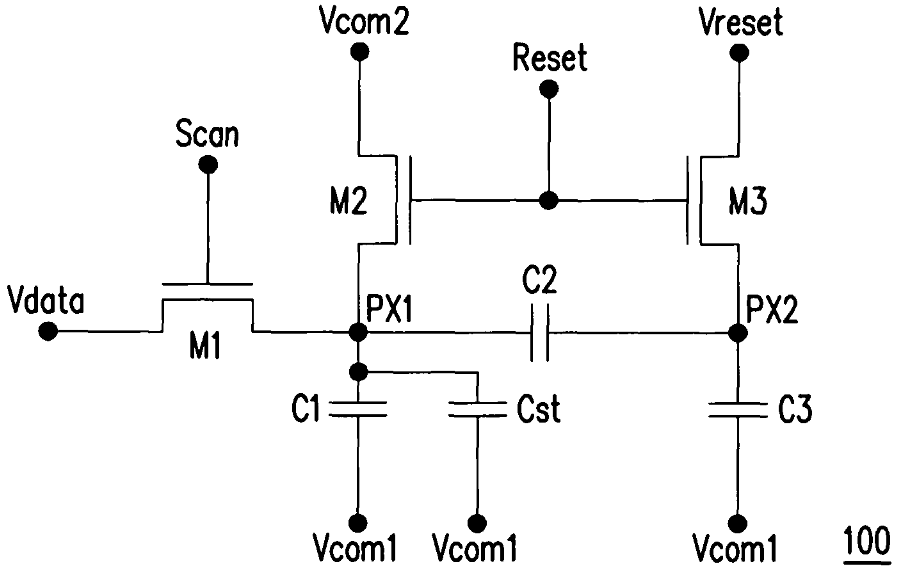
FIG. 1 is a circuit diagram illustrating a pixel circuit according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a circuit diagram illustrating a pixel circuit 100 according to an embodiment of the invention. Referring to FIG. 1, in the embodiment, the pixel circuit 100 includes a first pixel electrode PX1, a second pixel electrode PX2, first to third liquid crystal capacitors C1 to C3, a first storage capacitor Cst, and first to third switches M1 to M3. As an example, the first to third switches M1 to M3 may be capacitors. However, the embodiments of the invention are not limited thereto.

In the embodiment, the first liquid crystal capacitor C1 and the first storage capacitor Cst are located between the first pixel electrode PX1 and a first common voltage Vcom1. The second liquid crystal capacitor C2 is located between the first pixel electrode PX1 and the second pixel electrode PX2. The third liquid crystal capacitor C3 is located between the second pixel electrode PX2 and the first common voltage Vcom1.

A drain (corresponding to the first end) of the first switch M1 receives a data voltage Vdata, a gate (corresponding to the control end) of the first switch M1 receives a scan signal Scan, and a source (corresponding to the second end) of the first switch M1 is coupled to the first pixel electrode PX1. A drain (corresponding to the first end) of the second switch M2 receives a second common voltage Vcom2, a gate (corresponding to the control end) of the second switch M2 receives a reset signal Reset, and a source (corresponding to the second end) of the second switch M2 is coupled to the first pixel electrode PX1. A drain (corresponding to the first end) of the third switch M3 receives a reset voltage Vreset, a gate (corresponding to the control end) of the third switch M3 receives the reset signal Reset, and a source (corresponding to the second end) of the third switch M3 is coupled to the second pixel electrode PX2.

Based on the above, the pixel circuit 100 of the embodiment may control whether the first switch M1 is turned on or off by using the scan signal Scan, so as to control whether the data voltage Vdata is written into the pixel circuit 100. In addition, whether the second switch M2 and the third switch M3 are turned on or off may be controlled by using the reset signal Reset, so as to control whether the second common voltage Vcom2 and the reset voltage Vreset are respectively provided to the first pixel electrode PX1 and the second pixel electrode PX2.

Specifically, the first pixel electrode PX1 in the embodiment may be a sheet electrode (not shown), and the second pixel electrode PX2 may be a patterned electrode (not shown). In addition, the patterned electrode may exhibit a pattern of a comb-like structure. However, the invention is not limited thereto. The first pixel electrode PX1 as a sheet electrode and the second pixel electrode PX2 as a patterned electrode may be overlapped with respect to each other without electrical contact. In addition, electrical fields of the first pixel electrode PX1 and the second pixel electrode PX2 are formed through a hollow (or gap) portion of the second pixel electrode PX2. Accordingly, a horizontal electrical field may be generated in the liquid crystal based on a voltage difference between the first pixel electrode PX1 and the second pixel electrode PX2, so as to facilitate re-ordering of liquid crystal molecules.

In the embodiment of the invention, the scan signal Scan may be transmitted via one of a plurality of gate lines in a display panel (not shown), for example. In addition, the data voltage Vdata may be transmitted via one of a plurality of data lines in the display panel (not shown). Moreover, a plurality of pixels of the display panel (not shown) are in an array arrangement and are respectively arranged at intersections of the data lines and the gate lines. Accordingly, a pixel circuit (e.g., the pixel circuit 100) may be controlled via the corresponding gate lines and data lines to carry out circuit operations.

In the embodiment, the pixels of the display panel (not shown) may be construed with reference to the pixel circuit 100. For example, the pixel circuit 100 may control whether the first switch M1 is turned on or off by using the scan signal Scan. When the first switch M1 is turned on, the pixel circuit 100 may provide the data voltage Vdata to the first pixel PX1, and the storage capacitor Cst may store the data voltage Vdata.

Figure 2:
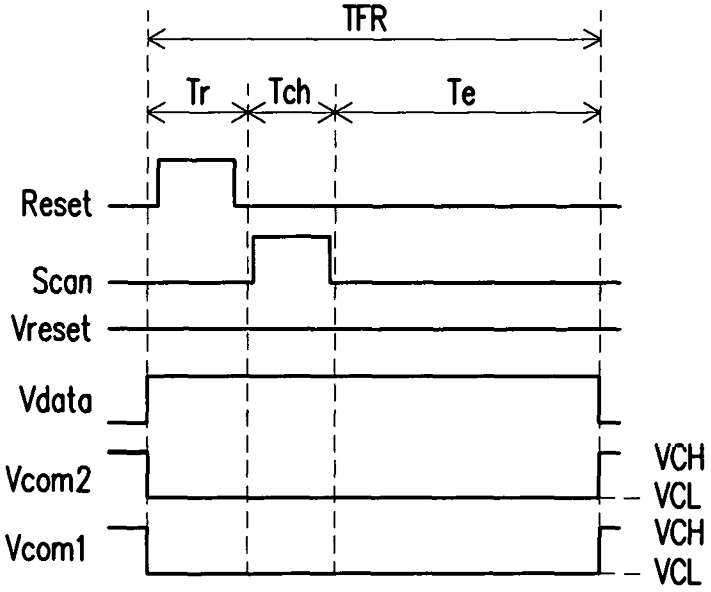
FIG. 2 is a schematic waveform diagram illustrating a pixel circuit according to an embodiment of the invention.
Figure 3A:
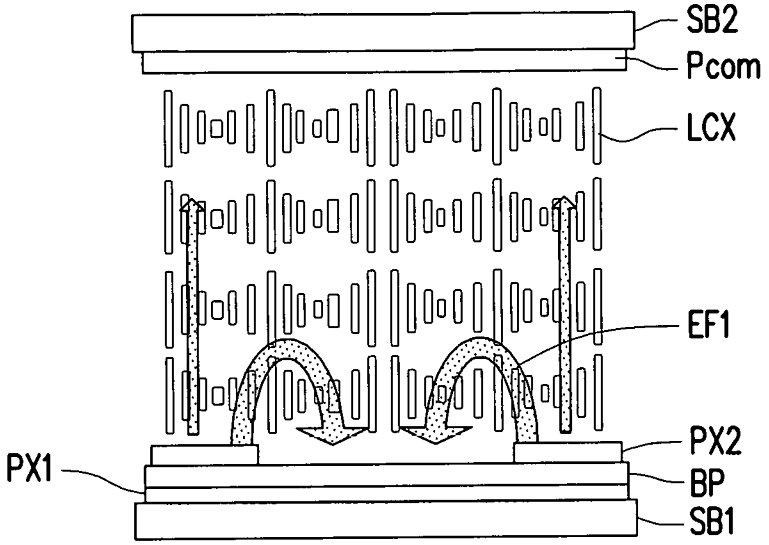
FIGS. 3A to 3C are schematic diagrams illustrating liquid crystal states during a reset period, a charging period, and an emitting period of a pixel circuit according to an embodiment of the invention.
Figure 3B:
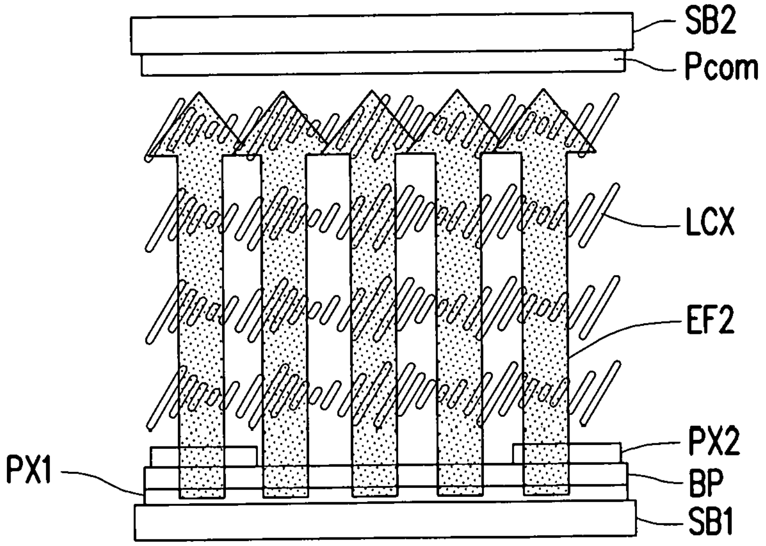
Figure 3C:
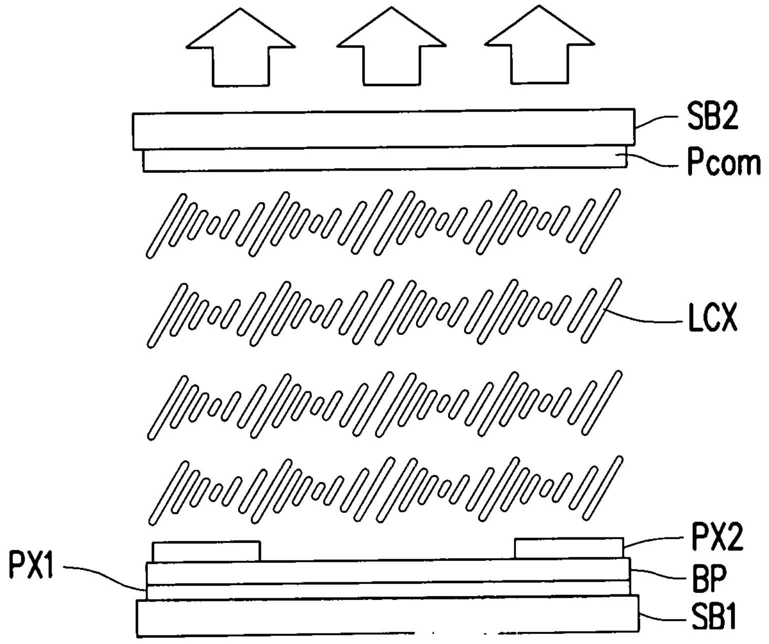

FIG. 2 is a schematic waveform diagram illustrating a pixel circuit according to an embodiment of the invention. FIGS. 3A to 3C are schematic diagrams illustrating liquid crystal states during a reset period, a charging period, and an emitting period of a pixel circuit according to an embodiment of the invention. Referring to FIG. 2, in the embodiment, a frame period TFR of the pixel circuit 100 may be divided into a reset period Tr, a charging period Tch, and an emitting period Te. In addition, the reset period Tr, the charging period Tch, and the emitting period Te are not overlapped with each other, and the charging period Tch is arranged between the reset period Tr and the emitting period Te. For example, in the frame period TFR, the reset period Tr and the charging period Tch of the pixel circuit 100 may be considered as a period when the pixel circuit 100 writes data, and the emitting period Te of the pixel circuit 100 may be considered as a display time period of the pixel circuit 100.

Referring to FIGS. 1 and 3A, in the embodiment, the second pixel electrode PX2 may be located between a common electrode Pcom transmitting the first common voltage Vcom1 and the first pixel electrode PX1. In addition, a liquid crystal layer LCX is disposed between the common electrode Pcom and the first pixel electrode PX1 as well as the second pixel electrode PX2. Moreover, a material of the liquid crystal layer LCX may include a uniform lying helix (ULH) structure liquid crystal. However, the embodiments of the invention are not limited thereto.

Besides, the first to third liquid crystal capacitors C1 to C3 of the embodiment may be considered as equivalent capacitors formed in the ULH structure liquid crystal. Besides, based on different circuit designs, the first common voltage Vcom1 of the embodiment may be a direct current (DC) common voltage or an alternating current (AC) common voltage. In the embodiment, the first common voltage Vcom1 is an AC common voltage, for example.

Referring to FIGS. 1, 2, and 3A, specifically, when the pixel circuit 100 is operated in the reset period Tr, the scan signal Scan may be set to be disabled (e.g., at a low voltage level). Accordingly, the first switch M1 may be turned off. Under the circumstance, the pixel circuit 100 is unable to provide the data voltage Vdata to the first pixel electrode PX1. Besides, in the reset period Tr, the reset signal Reset may be enabled (e.g., at a high voltage level). Accordingly, the second switch M2 and the third switch M3 may be turned on. Under the circumstance, the first common voltage Vcom1 and a second common voltage Vcom2 may be switched from a high common voltage VCH to a low common voltage VCL. In addition, the pixel circuit 100 may provide the second common voltage Vcom2 to the first pixel electrode PX1, so that the first pixel electrode PX1 is provided with the low common voltage VCL. Moreover, the pixel circuit 100 may also provide the reset voltage Vreset to the second pixel electrode PX2, so that the second pixel electrode PX2 may have the reset voltage Vreset. In the embodiment, a waveform of the second common voltage Vcom2 may be the same as a waveform of the first common voltage Vcom, and the reset voltage Vreset is different from the low common voltage VCL. However, the embodiments of the invention are not limited thereto.

Besides, when the pixel circuit 100 is operated in the reset period Tr, since the first pixel electrode PX1 receives the low common voltage VCL from the second common voltage Vcom2, and the second pixel electrode PX2 receives the reset voltage Vreset, the second pixel electrode PX2 may generate an electrical field EF1 toward a direction of the first pixel electrode PX1 on the second liquid crystal capacitor C2. In other words, a horizontal electrical field is formed between the first pixel electrode PX1 and the second pixel electrode PX2. Moreover, the horizontal electrical field generated between the first pixel electrode PX1 and the second pixel electrode PX2 is adopted to restore the arrangement of liquid crystal molecules in the ULH structure liquid crystal of the display panel to a default or initial state.

Referring to FIGS. 1, 2, and 3B, specifically, when the pixel circuit 100 is operated in the charging period Tch, the scan signal Scan may be set to be enabled (e.g., at a high voltage level). Accordingly, the first switch M1 may be turned on. Under the circumstance, the pixel circuit 100 may provide the data voltage Vdata to the first pixel electrode PX1, so that the storage capacitor Cst may store the data voltage Vdata. Besides, during the charging period Tch, the reset signal Reset may be set to be disabled (e.g., at a low voltage level). Accordingly, the second switch M2 and the third switch M3 may be turned off, so that the reset voltage Vreset is unable to be provided to the second pixel electrode PX2. Under the circumstance, the first common voltage Vcom1 and the second common voltage Vcom2 remain at the low common voltage VCL and the second pixel electrode PX2 may be floating.

Besides, when the pixel circuit 100 is operated in the charging period Tch, since the first pixel electrode PX1 has the received data voltage Vdata, and the second pixel electrode PX2 is in a floating state, the first pixel electrode PX1 may generate an electrical field EF2 toward a direction of the common electrode Pcom of the first common voltage Vcom1 on the first liquid crystal capacitor C1. In other words, a vertical electrical field is formed between the first pixel electrode PX1 and the first common voltage Vcom1. Moreover, the vertical electrical field generated between the first pixel electrode PX1 and the first common voltage Vcom1 may be adopted to rotate optical axes of the liquid crystal molecules in the ULH structure liquid crystal of the display panel, so that the liquid crystal molecules may form bright/dark grayscale levels.

Referring to FIGS. 1, 2, and 3C, specifically, when the pixel circuit 100 is operated in the emitting period Te, the scan signal Scan may be set to be disabled (e.g., at a low voltage level). Accordingly, the first switch M1 may be turned off. Under the circumstance, the pixel circuit 100 is unable to provide the data voltage Vdata to the first pixel electrode PX1 and the first pixel electrode PX1 may be floating. In addition, during the emitting period Te, the reset signal Reset may be set to be disabled (e.g., at a low voltage level). Accordingly, the second switch M2 and the third switch M3 are turned off, so that the reset voltage Vreset is unable to be provided to the second pixel electrode PX2 and the second pixel electrode PX2 may remain floating. Under the circumstance, the first common voltage Vcom1 and the second common voltage Vcom2 may remain at the low common voltage VCL.

Besides, when the pixel circuit 100 is operated in the emitting period Te, since the first pixel electrode PX1 still keeps the received data voltage Vdata, and the first pixel electrode PX1 and the second pixel electrode PX2 remain floating, the ULH structure liquid crystal in the pixel circuit 100 may still be driven, and the pixel circuit 100 may display a desired grayscale level based on the data voltage Vdata.

In FIGS. 3A to 3C, the first pixel electrode PX1 may be formed on a substrate SB1. In addition, a protective layer BP and the second pixel electrode PX2 are sequentially formed on the first pixel electrode PX1. Besides, the common electrode Pcom may be formed below a substrate SB2. Nevertheless, FIGS. 3A to 3C merely serve as schematic views of the liquid crystal states of the embodiment. Other components may be further disposed between the respective layers of components. For the ease of illustrations, FIGS. 3A to 3C merely illustrate the necessary components of the embodiment of the invention, and the invention is not limited thereto.

Based on the above, in the embodiment of the invention, when the pixel circuit 100 is operated in the reset period Tr, the reset signal Reset may be enabled (e.g., at a high voltage level) to turn on the second switch M2 and the third switch M3 in advance before the liquid crystal molecules are driven. Accordingly, the pixel circuit 100 may provide the second common voltage Vcom2 to the first pixel electrode PX1, so that the first pixel electrode PX1 may have the low common voltage VCL. Moreover, the pixel circuit 100 may also provide the reset voltage Vreset to the second pixel electrode PX2, so that the second pixel electrode PX2 may have the reset voltage Vreset. Under the circumstance, a horizontal electrical field may be formed between the first pixel electrode PX1 and the second pixel electrode PX2 and the re-arrangement of the liquid crystal molecules in the display panel may be facilitated. Accordingly, during the process of alternately switching between positive and negative electrical fields, the influence of the directions of the electrical fields on the optical axes of some liquid crystal molecules, which may lead to a disordered arrangement of liquid crystal molecules and a lower transmittance ratio, may be reduced.

Figure 4:
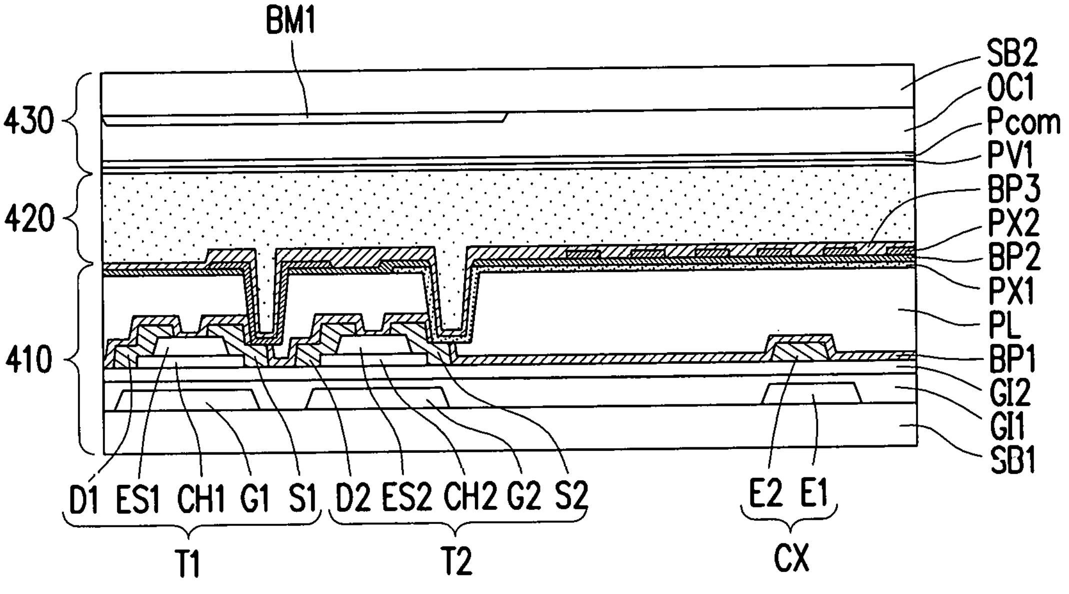
FIG. 4 is a schematic cross-sectional view illustrating a display panel according to an embodiment of the invention.

FIG. 4 is a schematic cross-sectional view illustrating a display panel according to an embodiment of the invention. The display panel includes an active array substrate 410, a liquid crystal layer 420, and a color filter substrate 430. On the substrate SB1 of the active array substrate 410, gates G1 and G2 and an electrode E1 are firstly formed, and then gate insulating layers GI1 and GI2 are sequentially formed. On the gate insulating layer GI2, channel layers CH1 and CH2 and an electrode E2 are formed. The electrodes E1 and E2 are adopted to form a capacitor CX, such as the storage capacitor Cst shown in FIG. 1. Moreover, etch stop layers ES1 and ES2, sources S1 and S2, and drains D1 and D2 are formed on the channel layers CH1 and CH2. The gate G1, the channel layer CH1, the etch stop layer ES1, the source S1, and the drain D1 form a transistor T1, and the gate G2, the channel layer CH2, the etch stop layer ES2, the source S2, and the drain D2 form a transistor T2.

On the electrode E2, the etch stop layers ES1 and ES2, the sources S1 and S2, and the drains D1 and D2, a protective layer BP1 and an insulating layer PL are sequentially formed. Then, the first pixel electrode PX1 is formed on the insulating layer PL, and the first pixel electrode PX1 contacts the source S2 through vias of the protective layer BP1 and the insulating layer PL. On the first pixel electrode PX1, a protective layer BP2 and the second pixel electrode PX2 are sequentially formed. In addition, the second pixel electrode PX2 contacts the source S1 through vias of the protective layer BP1 and the insulating layer PL. Then, a protective layer BP3 is formed on the second pixel electrode PX2 to form the active array substrate 410.

Besides, a black matrix BM1 is formed on the substrate SB2 of the color filter substrate 430. Then, a coating layer OC1 is formed. On the coating layer OC1, the common electrode Pcom and a passivation layer PV1 are sequentially formed. Accordingly, the color filter substrate 430 is completed. The usage "on . . . " is used with reference to the orientation in the manufacturing process, instead of the orientation in the drawings. Then, the active array substrate 410 and the color filter substrate 430 are assembled to each other, and liquid crystal is filled to form the liquid crystal layer 420. Accordingly, the display panel is completed.

Figure 5:
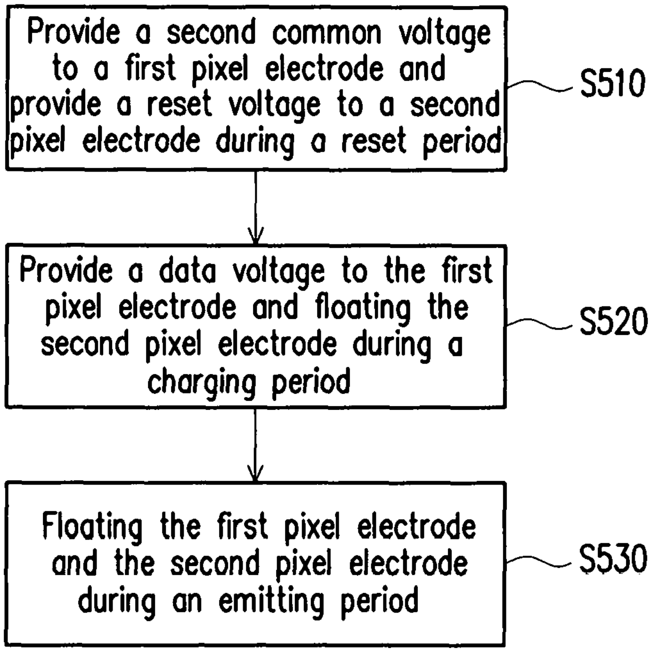
FIG. 5 is a flowchart illustrating a driving method of a pixel circuit according to an embodiment of the invention.

FIG. 5 is a flowchart illustrating a driving method of a pixel circuit according to an embodiment of the invention. Referring to FIGS. 1, 2, and 5, at Step S510, when the pixel circuit 100 is operated in the reset period Tr, the pixel circuit 100 may provide the second common voltage Vcom2 to the first pixel electrode PX1, and the pixel circuit 100 may also provide the reset voltage Vreset to the second pixel electrode PX2. At Step S520, when the pixel circuit 100 is operated in the charging period Tch, the pixel circuit 100 may provide the data voltage Vdata to the first pixel electrode, and the second pixel electrode PX2 may be floating. At Step S530, when the pixel circuit 100 is operated in the emitting period Te, the first pixel electrode PX1 and the second pixel electrode PX2 may be floating. Details for implementing the respective steps are already described in the foregoing embodiments and examples, and thus will not be repeated herein.

In view of the foregoing, according to the pixel circuit and the driving method of the pixel circuit according to the embodiments of the invention, the horizontal electrical field generated between the first pixel electrode and the second pixel electrode may be adopted to restore the arrangement of the liquid crystal molecules in the ULH structure liquid crystal of the display panel to the default or initial state. Accordingly, the re-arrangement of the liquid crystal molecules may be facilitated. In addition, the influence of the directions of the electrical fields on the optical axes of some liquid crystal molecules during the process of alternately switching between positive and negative electrical fields, which may lead to a disordered arrangement of liquid crystal molecules and a lower transmittance ratio, may be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel circuit, comprising:

a first pixel electrode;

a second pixel electrode;

a first liquid crystal capacitor, located between the first pixel electrode and a first common voltage;

a first storage capacitor, located between the first pixel electrode and the first common voltage;

a second liquid crystal capacitor, located between the first pixel electrode and the second pixel electrode;

a third liquid crystal capacitor, located between the second pixel electrode and the first common voltage;

a first switch, having a first end receiving a data voltage, a control end receiving a scan signal, and a second end coupled to the first pixel electrode;

a second switch, having a first end receiving a second common voltage, a control end receiving a reset signal, and a second end coupled to the first pixel electrode; and a third switch, having a first end receiving a reset voltage, a control end receiving the reset signal, and a second end coupled to the second pixel electrode, wherein, during a reset period, the second pixel electrode generates an electrical field toward a direction of the first pixel electrode on the second liquid crystal capacitor, so that a horizontal electrical field is formed between the first pixel electrode and the second pixel electrode.

2. The pixel circuit as claimed in claim 1, wherein the scan signal is enabled during a charging period, the reset signal is enabled during the reset period, and the scan signal and the reset signal are disabled during an emitting period.

3. The pixel circuit as claimed in claim 2, wherein the charging period, the reset period, and the emitting period are not overlapped with each other during a frame period, and the charging period is arranged between the reset period and the emitting period.

4. The pixel circuit as claimed in claim 1, wherein the first liquid crystal capacitor, the second liquid crystal capacitor, and the third liquid crystal capacitor are formed in a uniform lying helix (ULH) structure liquid crystal.

5. The pixel circuit as claimed in claim 1, wherein the first pixel electrode is a sheet electrode, and the second pixel electrode is a patterned electrode.

6. The pixel circuit as claimed in claim 5, wherein the second pixel electrode is located between a common electrode transmitting the first common voltage and the first pixel electrode.

7. The pixel circuit as claimed in claim 1, wherein the first common voltage is a direct current (DC) common voltage.

8. The pixel circuit as claimed in claim 1, wherein the first common voltage is an alternating current (AC) common voltage.

9. The pixel circuit as claimed in claim 1, wherein a waveform of the second common voltage is the same as a waveform of the first common voltage.

10. A driving method of a pixel circuit, wherein the pixel circuit has a first pixel electrode, a second pixel electrode, and a common electrode transmitting a first common voltage, and a liquid crystal layer is disposed between the common electrode and the first pixel electrode as well as the second pixel electrode, the driving method comprising:

providing a second common voltage to the first pixel electrode and providing a reset voltage to the second pixel electrode during a reset period;

providing a data voltage to the first pixel electrode and floating the second pixel electrode during a charging period; and floating the first pixel electrode and the second pixel electrode during an emitting period, wherein, during the reset period, the second pixel electrode generates an electrical field toward a direction of the first pixel electrode, so that a horizontal electrical field is formed between the first pixel electrode and the second pixel electrode.

11. The driving method of the pixel circuit as claimed in claim 10, wherein the charging period, the reset period, and the emitting period are not overlapped with each other during a frame period, and the charging period is arranged between the reset period and the emitting period.

12. The driving method of the pixel circuit as claimed in claim 10, wherein a material of the liquid crystal layer comprises a uniform lying helix (ULH) structure liquid crystal.

13. The driving method of the pixel circuit as claimed in claim 10, wherein the first pixel electrode is a sheet electrode, and the second pixel electrode is a patterned electrode.

14. The driving method of the pixel circuit as claimed in claim 10, wherein the second pixel electrode is located between the common electrode and the first pixel electrode.

15. The driving method of the pixel circuit as claimed in claim 10, wherein the first common voltage is a direct current (DC) common voltage.

16. The driving method of the pixel circuit as claimed in claim 10, wherein the first common voltage is an alternating current (AC) common voltage.

17. The driving method of the pixel circuit as claimed in claim 10, wherein a waveform of the second common voltage is the same as a waveform of the first common voltage.

* * * * *